US010550592B2

(12) United States Patent
Coenraets (10) Patent No.: US 10,550,592 B2
(45) Date of Patent: Feb. 4, 2020

(54) DEVICE FOR COVERING A SURFACE INCLUDING PROTECTIVE FLAPS (71) Applicant: BECOFLEX, Wauthier-Braine (BE)

(72) Inventor: Benoit Coenraets, Wauthier-Braine (BE)

(73) Assignee: Becoflex, Wauthier-Braine (BE)

( * ) Notice: Subject to any disclaimer, the term of this patent is extended or adjusted under 35 U.S.C. 154(b) by 0 days.

(21) Appl. No.: 16/087,171

(22) PCT Filed: Feb. 13, 2017

(86) PCT No.: PCT/EP2017/053144
§ 371 (c)(1),
(2) Date: Sep. 21, 2018

(87) PCT Pub. No.: WO2017/162368
PCT Pub. Date: Sep. 28, 2017

(65) Prior Publication Data
US 2019/0063093 A1 Feb. 28, 2019

(30) Foreign Application Priority Data

Mar. 23, 2016 (BE) .................................. 2016/5202

(51) Int. Cl.
E04H 4/10 (2006.01)
A63C 19/12 (2006.01)
B60J 7/08 (2006.01)

(52) U.S. Cl.
CPC ............. E04H 4/101 (2013.01); A63C 19/12 (2013.01)

(58) Field of Classification Search
CPC ....................................................... E04H 4/101
USPC ............................................................ 4/502
See application file for complete search history.

(56) References Cited

FOREIGN PATENT DOCUMENTS

| FR | 2259721 A1 | 8/1975 |
| WO | 2010010152 A1 | 1/2010 |
| WO | 2010054960 A1 | 5/2010 |
| WO | 2014064138 A1 | 5/2014 |
| WO | 2014068131 A1 | 5/2014 |

Primary Examiner — Lori L Baker
(74) Attorney, Agent, or Firm — Blue Filament Law PLLC (57) ABSTRACT A device for covering a surface and includes: (a) a covering of which each longitudinal edge is provided with a longitudinal strip ending in a flap; (b) a rotatably mounted drum capable of winding or unwinding the covering, and movable on rails placed on either side of said surface; (c) a system for continuous locking/unlocking of the flap in the rails during the translation of the drum, in which the covering includes at least one flap which makes it possible to isolate the portion of the longitudinal strip corresponding to the stuck flap portion, either from the atmosphere contained between the inner surface of the deployed covering portion and the covered surface portion, or from solar radiation.

15 Claims, 4 Drawing Sheets

DEVICE FOR COVERING A SURFACE INCLUDING PROTECTIVE FLAPS

FIELD OF THE INVENTION

The invention relates to a device for covering the surface that is easy to implement and better meets the requirements of the relevant application. In particular, the present invention relates to a covering device in which the cover comprises a particular securing system to allow the longitudinal edges of the cover to be reversibly anchored as the cover is deployed. The present invention proposes a solution for lengthening the life of such a device.

TECHNOLOGY BACKGROUND

Covers are applied to surfaces for reasons which are dependent on the nature of these surfaces. Thus, in the case of a basin such as a swimming pool the cover may prevent contamination with leaves or by animals, may allow savings on energy, water and reagents, and may or must afford the safety of individuals and in particular children. In the case of a desalination basin or basin used for other fluid treatments, a cover makes it possible to avoid the liquid becoming diluted with rainwater or excessive evaporation due to heat.

In the case of a sports ground such as an outdoor grass-court or clay-court tennis court, a cover affords protection against inclement weather, and in particular intermittent rain. Moreover, a vehicle body is covered notably to ensure that the loads remain stable in the depression caused by the movement of the vehicle and to protect same against inclement weather. Covers are also used as blinds for greenhouses, conservatories or vehicle windows in order to prevent any overheating inside, and as sunscreens for patio awnings.

In all instances, the search is generally for a covering device that is economic allowing easy, dependable, repeatable and quick covering and uncovering, requiring a minimum of human intervention, and above all, having the longest life possible. Numerous devices for covering a surface have been developed, ranging from basic models to more sophisticated ones. Such devices are described for example in WO2014068131.

One advantageous type of covering device comprises a motorized drum mounted on a longitudinal-translation mechanism. This mechanism moves the drum over the surface that is to be covered, literally allowing the cover to be "laid" on the surface, as it deploys, by unrolling it from the drum simultaneously with the longitudinal movement thereof, and then lifted off, as it is removed, by simultaneously rolling it up on the drum. The cover therefore does not slide over the surface either when it is being deployed or when it is being removed. The covering device also comprises a system for securing the covering to one transverse end of the surface that is to be covered so that the translational and rotational movements of the drum cause the cover to be unrolled or rolled up over the surface that is to be covered.

In the present application, the terms "longitudinal" "transverse" and derivatives thereof refer respectively to the direction of travel of the drum and to the direction of the axis of revolution thereof.

There are such covering devices that allow the longitudinal edges of the covering to be secured as the covering is being deployed and, in some instances to apply transverse tension to said covering in order to tension it perfectly. Such devices are described in WO2010/010152, WO2010/054960 and Belgian patent application BE2012/0725. In these devices, the longitudinal edges of the cover are provided with a rod or bead which is introduced into the upward-facing opening of a U-section rail with one or two flanges partially closing said opening. The bead slipping under a flange and being held in this position by suitable securing means allows the longitudinal edges of the cover to be secured firmly.

As described in WO2010010152 and WO2014064138, the bead in such covers is typically formed as a projection on a free exterior edge of a longitudinal strip which is secured to each longitudinal edge of the cover at the interior edge thereof, opposite to the exterior edge. However, it has been found in several instances, particularly in outdoor applications and/or swimming pool covers, that the longitudinal strips and the beads thereof very rapidly degrade and need to be changed after excessively short intervals of time. It is clear that, as a cover is deployed and removed, the longitudinal strips and the beads thereof are exposed to harsh abrasion loadings and that the material used needs to be chosen with care. Despite a careful choice of materials that exhibit high abrasion resistance, the problem of accelerated degradation of the longitudinal strips and of their bead remains.

The present invention proposes a solution to the accelerated degradation of the longitudinal strips and beads thereof which is observed in serval devices used to cover a surface with a cover, the longitudinal edges of which are secured.

SUMMARY OF THE INVENTION

The invention is thus defined in the main claim and preferred alternative forms of embodiment are defined in the dependent claims. The present invention notably comprises a device for covering a surface comprising:
  (a) a substantially rectangular cover comprising an internal face and an external face which are separated from one another by the thickness of the cover, and having two longitudinal edges opposite one another and two transverse edges opposite one another,
  (b) a longitudinal strip comprising an interior edge being fixed to each longitudinal edge of the cover, and comprising an exterior edge which is free and equipped with a projecting bead extending along said edge,
  (c) a drum mounted with the ability to rotate able to roll up and unroll the cover, said drum being mounted on a mechanism for longitudinal translation along
  (d) rails positioned one on each side of said surface and each made up of a profiled section having an opening on one of its faces and facing away from the surface that is to be covered, said face comprising at least one adjacent flange situated on the side adjacent to the surface that is to be covered and partially closing said opening, said translation mechanism allowing longitudinal translation of the drum in a first direction that causes the cover to be unrolled and deployed over the surface that is to be covered with the internal face facing toward said surface and, in a second direction, that causes the cover to be rolled up and removed from said surface,
  (e) a deflection surface provided on each side of the surface that is to be covered so as to guide and position said bead of each longitudinal strip of the cover to face the opening in the corresponding rail as the drum effects the translational movement in the first direction causing the cover to unroll, (f) a system for continuously locking the bead of the longitudinal edges of the cover in the opening of said rails making it possible, once the bead has been engaged in the opening, to lock it by wedging it under the adjacent flange of the corresponding rail as the cover is gradually unrolled as the drum effects the translational movement in the first direction D1, and, as the drum effects the translational movement in the second direction D2, to release the bead, allowing it to disengage as the cover is gradually rolled up.

The device of the present invention is characterized in that the cover comprises at least one flap extending along each of its longitudinal edges and able, when a portion of each bead is wedged under the adjacent flange of the corresponding rail, to isolate the portion of the longitudinal strip that corresponds to the trapped bead portion either from the atmosphere prevailing between the internal face of the deployed cover portion and the surface portion covered, or from solar radiation.

In a first alternative form of embodiment the device comprises an internal flap extending from the internal face of the cover as far as a free end covering part of the longitudinal strip, without covering the bead, so that when the bead is wedged under the adjacent flange of the corresponding rail, said internal flap is compressed between the adjacent flange and the longitudinal strip, preferably without entering or covering the opening in the rail, thus forming a relatively fluidtight seal. Such an internal flap makes it possible to protect the longitudinal strip from corrosive vapors found under the cover, such as chlorine vapors, ozone vapors or vapors of other compounds used to sterilize swimming pool water.

In an alternative form of embodiment that is additional or alternative to the preceding one, the device comprises an external flap extending from the external face of the cover as far as a free end covering the longitudinal strip, including the bead, so that when the bead is wedged under the adjacent flange of the corresponding rail, said external flap covers the longitudinal strip and preferably also covers the opening in the rail. Such an external flap protects the longitudinal strip from the oxidizing effects of solar radiation.

It is preferable for at least one flap to be an integral part of the cover, the longitudinal edge of the cover forming a free end of the at least one flap. If the cover comprises an internal flap and external flap, at least one flap may be formed by a tape comprising an internal edge fixed to the cover parallel to each longitudinal edge of the cover, and a free external edge forming the free end of the at least one flap. The tape may be fixed to the cover by welding, bonding, stitching, stapling or riveting.

The longitudinal strip including the bead preferably comprises a fabric made of ultrahigh molecular weight polyethylene (UHMPE) fibers (e.g. Dyneema) or of high density polyethylene (PEHD) fibers, or of aramid fibers (e.g. Kevlar, Twaron) or of aromatic polyester fibers (e.g. Vectran), and in which the fabric is preferably braided or woven or embroidered. Such materials are abrasion-resistant but may be sensitive to UV radiation and to the chlorinated or ozone vapors emanating from a swimming pool. The longitudinal strip may be fixed to the cover by stitching, bonding, welding, stapling or riveting. Because the materials of the cover and of the longitudinal strip often differ, it is preferable for the longitudinal strip to be stitched to the cover.

The locking system of a device according to the present invention preferably additionally comprises two flexible belts, each one being able during the translational movement of the drum in the first direction, to lay itself down in the opening in the corresponding rail as the cover is gradually unrolled once the bead has been engaged under the adjacent flange of this rail, thus wedging it therein, and during the translational movement of the drum in the second direction, to remove itself from said opening, thus releasing the bead and allowing it to disengage as the cover is gradually rolled up.

The movement mechanism preferably comprises a carriage mounted on the rails and transversely overhanging the surface that is to be covered and supporting the drum comprising at each of its ends:

(a) a drive wheel, the axis of rotation of which is parallel to that of said drum;

(b) at least a first downstream roller and at least a second upstream roller resting on the rails and allowing the longitudinal translational movement of the carriage and which are mounted, the first one downstream and second one upstream of the drive wheel in the first direction of travel and therewith constitute a triangle of which the drive wheel forms a top vertex;

and in to the four corners of the surface that is to be covered and extends along the longitudinal edges of the surface that is to be covered, as follows:

(c) it sits over the downstream roller which lays it down in the opening in the corresponding rail as the carriage moves in the first direction D1, and it sits over the upstream roller which lays it down in the opening of the corresponding rail when the carriage moves in the second direction, D2, comprised between a fixing point and the roller closest to said fixing point, and (d) it sits without slipping on the drive wheel in the central section comprised between the two rollers The deflection surface is preferably at least partially formed of an interior surface of a slot arranged in an engagement shoe:

said slot having a face opening extending over a surface parallel to the corresponding rail and facing toward the surface that is to be covered, said opening having a width less than the dimension of the bead located inside the slot and greater than the thickness of the longitudinal strip which comes out of the slot via said opening, so that the longitudinal strip can slide along the slot but the bead cannot leave the slot via the face opening, and said slot comprises a curved cross section allowing the bead of the cover to be brought tangentially into the opening and under the adjacent flange of the corresponding rail.

The insertion shoe may comprise a substantially cylindrical deflection pulley mounted with the ability to rotate about an axis parallel to the transverse direction of the cover. The deflection pulley has a distal end distant from the surface that is to be covered, and a proximal end adjacent to said surface. The curved cross section of the slot is then formed at least in part by the distal end of the deflection pulley against which there presses the corresponding bead of the cover which is partially wrapped around said deflection pulley so as to change orientation. Thus, the distal end of each deflection pulley situated on each side of the surface that is to be covered may press on the corresponding bead, thus applying tension to the cover in the transverse direction as it is being unrolled, said tension being maintained as the cover is being locked in the rails.

The device of the present invention may additionally comprise a tensioning bearing mounted with the ability to rotate on each engagement shoe, about an axis of rotation transverse, and preferably normal, to the transverse edges of the covering and which guides the bead of the covering into the slot in the corresponding engagement shoe.

A device according to the present invention is particularly suited to covering a surface selected from:
(a) a basin which may or may not be filled with a liquid, such as a pool, a water desalination, treatment or retaining basin;
(b) a sports ground, such as a tennis court or cricket pitch;
(c) a vehicle bodyshell,
(d) a glazed surface such as a greenhouse, a conservatory or a vehicle window.

BRIEF DESCRIPTION OF THE FIGURES

These aspects, together with other aspects of the invention, will be clarified in the detailed description of some particular embodiments of the invention, reference being made to the drawings of the figures, in which:

FIG. 7: shows (a) an engagement shoe in the absence of its pulley and of its bearing and (b) a section through the deflection pulley and tensioning bearing mounted on the shoe of (a).

DETAILED DESCRIPTION OF PARTICULAR EMBODIMENTS

Figure 1:
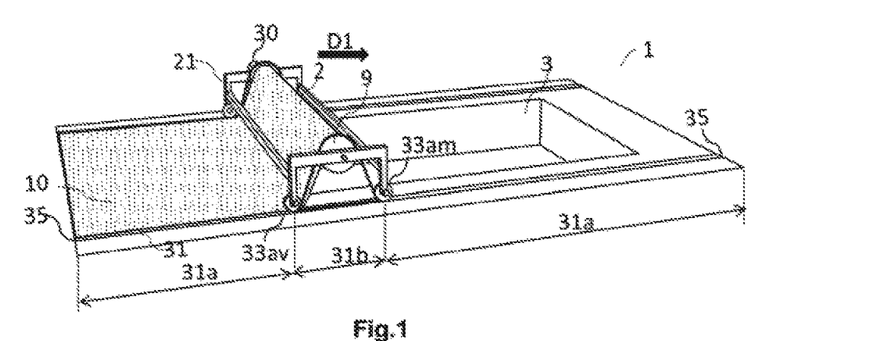
FIG. 1 is an overall perspective view of a surface with the drum in a position such that only part of the surface is covered by a cover.
Figure 2:
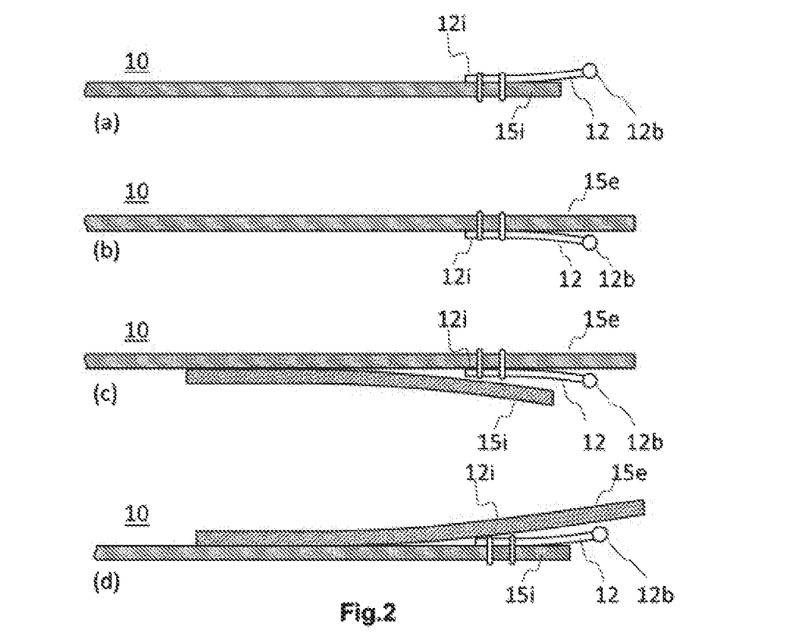
FIG. 2 depicts cross sections of a beaded longitudinal strip attached to one longitudinal edge of a cover and comprising one or two internal and/or external protective flaps according to various alternative forms of embodiment of the present invention.
Figure 3:
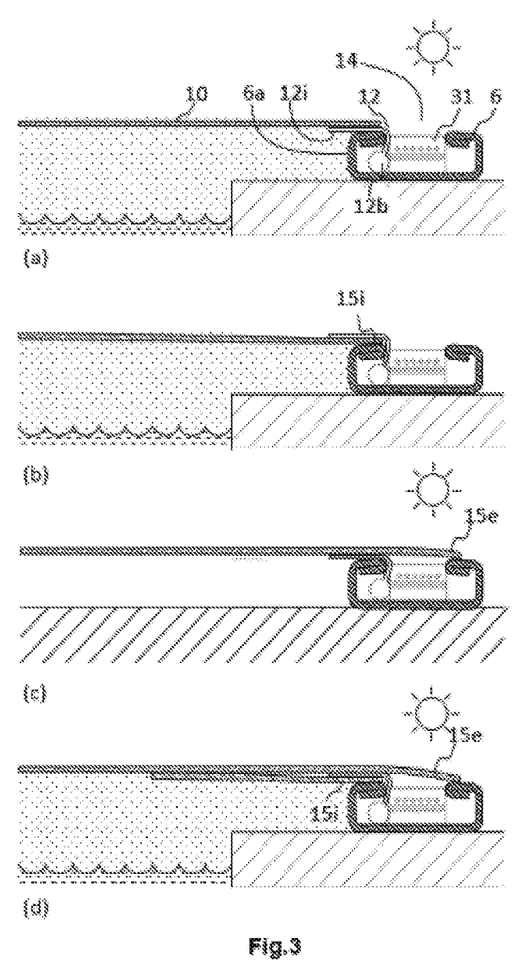
FIG. 3 depicts cross sections through a rail with the bead inserted under a flange of the rail and of the means for locking it in place (a) cover according to the prior art and (b) and (d) various alternative forms of embodiment of the present invention with one or two internal and/or external protective flaps.

As depicted in FIG. 1, the automatic device (1) for covering a surface (3) according to the invention comprises a cover (10) intended to cover said surface (3). The device (1) notably makes it possible to cover surfaces defined by the outline of a water basin, such as a swimming pool, water treatment basin, waste water purification plant, retention basin, desalination plant, etc. However, the invention may be implemented in any field that requires the covering of a surface, such as, for example, a clay-court or grass-court tennis court, a vehicle body, a glazed surface of a greenhouse, of a window of a vehicle such as a bus or train, or a conservatory, etc. Thus, in general, what is meant in the present application by "surface" is any zone delineated by a perimeter.

The device (1) comprises a drum (2) which has a length at least equal to the width of the cover (10), the cover needing to be sufficiently wide and sufficiently long to cover the entire surface (3) that is to be protected, when it is deployed. The drum (2) is mounted on a longitudinal translation mechanism comprising rails (6) placed on each side of said surface (3) and allowing the drum to be moved in a first direction (D1) of translation, that allows the cover to be deployed, and a second direction (D2) of translation that allows the cover to be removed. During the longitudinal translation of the drum (2) the latter has two directions of rotation: the first direction of rotation (during the translational movement in the first direction) allowing it to unroll the cover (10) to deploy it and cover the surface that is to be protected (3), and the second direction of rotation (during the translational movement in the second direction) allowing it to roll up the cover (10) so as to remove it and provide access to said surface (3).

The device (1) further comprises a securing system situated at one transverse end of the surface that is to be covered and allowing the cover to be unrolled/rolled up over the surface that is to be covered (3) during the translational and rotational movements of the drum (2). Any known type of securing system that meets the stress and safety criterial dependent on the application can be used for that purpose. For example, the securing system may comprise a plurality of straps attached to the visible transverse end of the cover (10), said straps being, for example, fitted with anchoring hooks which can be fixed to the transverse part of the contour delimiting the surface that is to be covered (3). Alternatively, the end of the cover that is to be secured can be provided with eyelets which are be secured to the transverse edge of the surface using a series of anchors, screws, a cable, or any other means. These anchorage means keep the visible transverse end of the cover (10) immobilized, allowing longitudinal tension to be generated thereon and allowing it to be unrolled without the need to motorize the rotation of the drum (2) when it is moving in the first direction (D1) in order to cover the surface (3).

Figure 5:
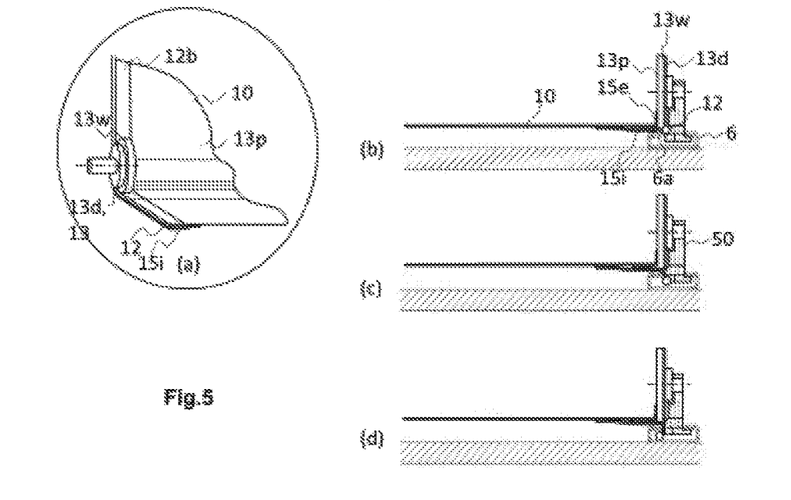
FIG. 5 illustrates a perspective cross section of the principle of operation of the engagement means comprising a deflection pulley and the cover being equipped with internal and/or external protective flaps.
Figure 6:
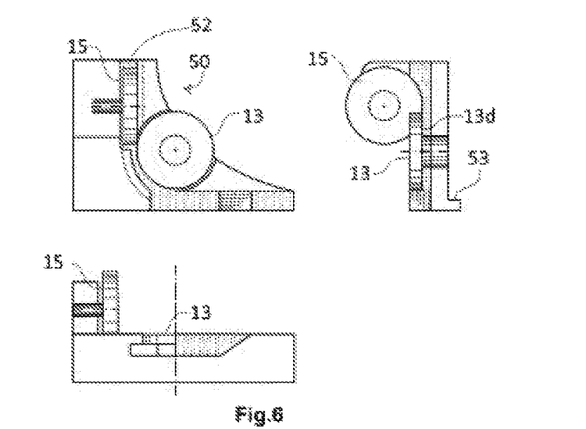
FIG. 6 shows one example of an engagement shoe.
Figure 7:
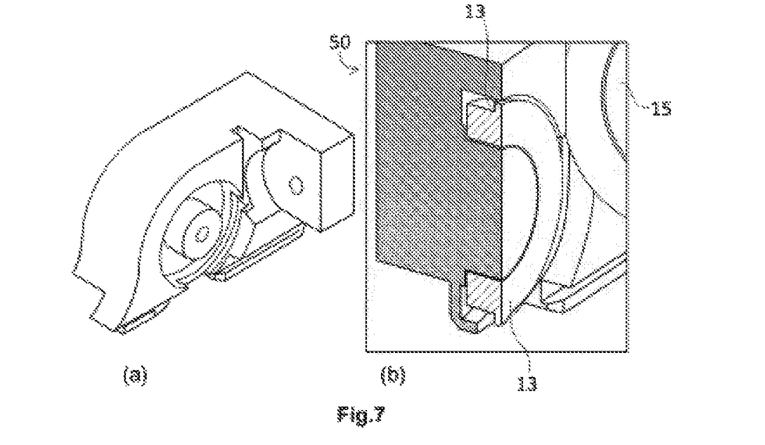

The rails (6) positioned on each side of said surface (3) are each made of a profile section having an opening (14) on one of its faces and facing away from the surface that is to be covered. The opening (14) is partially closed by at least an adjacent flange (6a) situated on the side adjacent to the surface that is to be covered. The device (1) comprises deflection surfaces (13) which may be formed by an interior surface of a slot (52) and/or a surface of a deflection pulley (13w) which are illustrated in FIGS. 5 to 7. The deflection surfaces (13) make it possible to change the orientation of the cover which presents at an angle between the drum and the surface that is to be covered, so as to orient it parallel to the surface that is to be covered and thus guide the bead toward the opening (14) of the corresponding rail (cf. FIGS. 5(a) and 6(a)).

The system for continuously locking the bead (12b) of the longitudinal edges of the cover (10) in the opening (14) of said rails (6) makes it possible, once the bead has been engaged in the opening, to lock it by wedging it under the adjacent flange (6a) of the corresponding rail as the cover (10) is gradually unrolled (cf. FIGS. 3 and 5(b) to (d) and, when the drum is moved translationally in the second direction (02), to release the bead allowing it to disengage as the cover is gradually rolled up. The use of an engagement shoe (50) makes it possible to ensure that once the bead has been presented to the opening (14) in the corresponding rail, the bead is systematically guided into the opening and under the adjacent flange (6a).

The locking system comprises a means of partially closing the opening (14) in the rail in its portion corresponding to the deployed portion of the cover, leaving only a residual opening. The partial closure needs to be such that, on the one hand, it allows the thickness of the cover to pass through the residual opening and, on the other hand, it does not allow the thickness of the longitudinal strip of the bead to pass through the residual opening and thus allows the bead to be locked under the adjacent flange (6a) inside the rail (6). Such a means of partial closure preferably takes the form of a flexible belt (31) of a width slightly smaller than the span of the opening (14) and which is inserted into the opening in the rail as the bead (12b) is gradually guided under the adjacent flange (6a). Thus, as the drum moves translationally in the first direction (D1), the belt (31) gradually as the cover (10) is unrolled lays itself down in the opening (14) in the corresponding rail once the bead has been engaged under the adjacent flange (6a) thereof, thus wedging it therein, and during the translational movement of the drum in the second direction, the belt (31) is removed from said opening (14), thus releasing the bead and allowing it to disengage gradually as the cover is rolled up.

As illustrated in FIG. 3(a), once the bead is locked under the adjacent flange (6a), the longitudinal edge of the cover (10) is held firmly even in the event of very high mechanical stress loadings on the cover (10) due for example to a depression or to gravitation. In the case of swimming pools, it confers safety in the event of (authorized or unauthorized) access onto the cover. The strength of the locking system may easily achieve a range from 5 to 10 kN/m (500 to 1000 kg/m), which is sufficient for many applications. Depending on the materials used, greater locking strengths may be achieved.

However, it has been found in several instances, particularly in outdoor applications and especially for swimming pool covers, that the longitudinal strips and beads thereof degrade very quickly, even though materials that have particularly high abrasion resistance have been used, such as ultrahigh molecular weight polyethylene (UHMPE) fibers (for example Dyneema®), or high-density polyethylene (PEHD) fibers, or aramid fibers (for example Kevlar® or Twaron®) or aromatic polyester fibers (for example Vectran®). Following analysis of the degraded products it was concluded that there are two sources of degradation that can be considered: (a) UV radiation from the sun and (b) vapors of chlorine or ozone or other sterilizing product which are present in the free space between the water of a swimming pool and the cover. Specifically, in the latter instance, because the cover with its longitudinal edges locked forms an essentially sealed covering, the concentration of aggressive compounds in said free space may be higher than with other types of cover which are less sealed, if sealed at all. These two sources are therefore the cause of the accelerated degradation of the longitudinal strips and the beads thereof which is seen in various installations. The present invention was born out of these hypotheses.

As illustrated in FIGS. 2 and 3(b) to (d), the present invention consists in providing the cover with at least one flap (15e, 15i) extending along each of its longitudinal edges and able, when a portion of each flap is wedged under the adjacent flange (6a) of the corresponding rail, to isolate that portion of the longitudinal strip that corresponds to the portion of wedged bead either (a) from the atmosphere prevailing between the internal face of the deployed cover portion and the covered surface portion or (b) some solar radiation.

As illustrated in FIGS. 2(a), (c), (d) and 3(b), (d), covers of devices according to the present invention may comprise an internal flap (15i) extending from the internal face of the cover as far as a free end covering part of the longitudinal strip, without covering the bead, such that when the bead is wedged under the adjacent flange (6a) of the corresponding rail, said internal flap is compressed between the adjacent flange (6a) and the longitudinal strip, preferably without entering or covering the opening (14) in the rail, and thus forming a relatively sealed join. Through this simple but effective solution, the longitudinal strips and their beads are protected from aggressive vapors that may be present in the free space between the water and the cover in a basin. As can be seen in FIG. 5, the presence of an internal flap (15i) does not interfere with the mechanism for locking the bead of a cover under the adjacent flange of the corresponding rail.

As illustrated in FIGS. 2(b) to (d) and 3(c), (d), in an alternative or additional form of embodiment, the cover may be provided with an external flap (15e) extending from the external face of the cover as far as a free end that covers the longitudinal strip, including the bead, so that when the bead is wedged under the adjacent flange (6a) of the corresponding rail, said external flap covers the longitudinal strip, and preferably also covers the opening (14) of the rail. In the alternative form depicted in FIG. 3(c), the external flap extends in such a way as to cover the entire width of the opening (14) and thus protect from solar radiation not only the bead (12b) but also the belt (31) inserted in the rail and which thus locks the bead under the adjacent flange (6a) as explained in greater detail below. As can be seen in FIG. 5, the presence of an external flap (15e) does not interfere in a negative way either with the deflection surface or with the mechanism for locking the bead of a cover under the adjacent flange of the corresponding rail. In the alternative forms of embodiment of FIGS. 2(c) and (d) and 3(d), the cover is equipped with an internal flap (15i) and with an external flap (15e).

As illustrated in FIGS. 2(a) to (d), it is preferable if at least one of the internal or external flaps is an integral part of the cover, the longitudinal edge of the cover forming the free end of at least either the internal or the external flap. For example, the cover in FIG. 2(a) comprises only an internal flap (15i) which is simply the continuation of the cover. Conversely, the cover in FIG. 2(b) comprises only an external flap (15e) which is the continuation of the cover. The longitudinal strip (12) can be secured to the cover by stitching, bonding, welding, stapling or riveting. Because the materials used for the longitudinal strip are not necessarily compatible with the materials used for the cover (for example a longitudinal strip made of Dyneema® (UHMPE) and a cover made of PVC cannot readily be welded or bonded together), coupling of the longitudinal strip to the cover by stitching is often preferred, as illustrated in FIG. 2.

The covers in FIGS. 2(c)&(d) both comprise an internal flap (15i) and an external flap (15e), where one of the two, internal or external, flaps is an integral part of the cover (10); in FIG. 2(c) it is the external flap (15e) which is integral with the cover and in FIG. 2(d) it is the internal flap (15i) which is integral. The other flap, which is not integral with the cover, is formed by a ribbon comprising an internal edge fixed to the cover parallel to each longitudinal edge of the cover, and a free external edge forming the free end of this flap. The ribbon may be secured to the cover by welding, bonding, stitching, stapling or riveting. If the ribbon is made of the same material as the cover, they may be joined together by welding.

The choice as to whether to use an internal flap (15i), an external flap (15e) or both is dependent on the application of the cover. For example, FIG. 2(b) shows a cover covering an indoor swimming pool, comprising only an internal flap and no external flap because it is not exposed to solar radiation. The internal flap, wedged between the adjacent flange and the longitudinal strip, allows the longitudinal strip to be isolated from potentially oxidizing vapors present in the space comprised between the cover and the swimming pool. The problem of oxidation of the longitudinal strips by swimming pool vapors is more pronounced in surface covering systems according to the present invention than in traditional systems for the following reasons. First, vapors of the sterilizing products typically used in swimming pool water (chlorine, ozone, etc.) are present therein at higher concentrations than in swimming pools covered by more conventional covers because the covers of the present invention allow the surface to be covered in a far more sealed manner than in most conventional systems. Second, because the longitudinal strips are subjected to severe friction as they are repeatedly inserted into and removed from the rails, the choice of materials does not make it possible to optimize both in terms of ability to withstand friction and ability to withstand oxidation. For these reasons, the problem of degradation by oxidation is therefore greater in covering systems according to the present invention, than in more conventional systems.

FIG. 3(c) illustrates a cover covering a solid outdoor surface (for example a clay-court or grass-court tennis court, comprising only an external flap (15e) and no internal flap (15i). The external flap (15e) protects the longitudinal strip from oxidation by solar UV radiation. As discussed above, if the flap extends in such a way as to completely cover the opening (14) in the rail, as illustrated in FIG. 3(c), the belt (31) used for the translational movement of the carriage and for the locking of the bead (12b) as explained later is also protected from solar radiation, making it possible to extend the service life of the polymer components of the covering system, which may be sensitive to solar radiation.

FIG. 3(d) illustrates a cover comprising an external flap (15e) protecting the longitudinal strip from solar radiation and an internal flap (15i) protecting it from vapors concentrated under the cover. For example, such a situation may arise in the case of an outdoor swimming pool.

Figure 4:
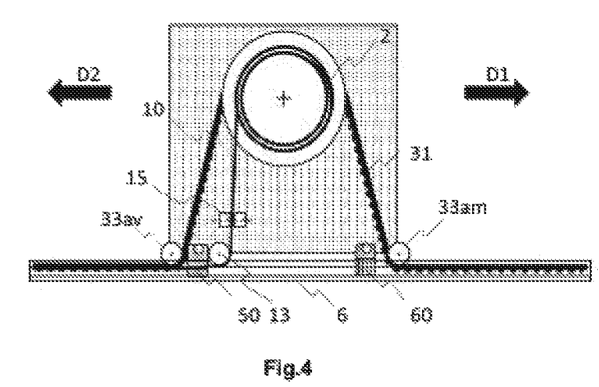
FIG. 4 shows a side view of a carriage comprising translation means and engagement and securing means.

In order for the bead to present to the opening in the rail correctly, it is preferable to provide bead guiding means. A first guide means is afforded by deflection surfaces (13) which may be formed by an interior surface of a slot and/or a bearing surface of a deflection pulley (13w). The deflection surface may be comprised in an engagement shoe, as illustrated in FIGS. 4, 6 and 7. The deflection surfaces allow the bead (12b) of each edge of the cover to be guided and positioned toward the opening (14) of the corresponding rail (6) during the translational movement in the first direction (D1) of the drum, causing the unrolling of the cover (cf. FIG. 4).

As illustrated in FIGS. 6 and 7, the deflection surface (13) may be at least partially formed by an interior surface of a slot (52) arranged in an engagement shoe (50), such that said slot has a face opening extending over a surface parallel to the corresponding rail (6) and facing toward the surface that is to be covered, said opening has a width less than the dimension of the bead (12b) located inside the slot and greater than the thickness of the cover (10) which comes out of the slot by said opening, so that the cover can slide along the slot but the bead cannot leave the slot via the face opening, and said slot comprises a curved section allowing the bead of the cover (10) to be brought tangentially under the adjacent flange (6a) of the corresponding rail.

In a preferred alternative form of embodiment, the insertion shoe comprises a substantially cylindrical deflection pulley (13w) mounted to rotate about an axis parallel to the transverse direction of the cover (cf. FIGS. 5 to 7). This deflection pulley comprises a distal end (13d), distant from the surface that is to be covered, and a proximal end (13p) adjacent to said surface to be covered (cf. FIG. 5(b)). The curved section of the deflection surface described hereinabove is then formed at least in part by the distal end (13d) of the deflection pulley against which the corresponding bead of the cover rests, which cover is partially wrapped around said deflection pulley in order to change orientation. One example of an arrangement of an engagement shoe comprising a deflection pulley is depicted in FIGS. 6 and 7. A deflection pulley also allows the cover to be subjected to a transverse tension during the locking as discussed below. The important thing is that the distal end (13d) of the pulley (13w) offers a deflection surface (13) against which the bead can bear and be held. It can be seen in FIGS. 5(b)-(d) that the external flap (15e) does not enter the slot and bears against the proximal end (13p) of the deflection pulley (13w) and therefore does not interfere with the guiding of the bead under the adjacent flange of the corresponding rail.

In one preferred embodiment, the cover is subjected to a transverse tension as it is deployed, in order to guarantee a smooth, stable and appealing appearance. In order to insert the beads (12b) into the openings in the rails (6) by applying such a transverse tension to the cover, this cover is wrapped around each deflection surface (13) in such a way that the bead (12b) bears against an interior surface of a slot or against the surface of the distal end (13d) of a deflection pulley (13w). In order to ensure such positioning of the beads (12b) with respect to the deflection surfaces (13), the system may comprise tensioning bearings (15) mounted to rotate about an axis of rotation that is transverse, preferably normal, to the transverse edges of the cover and which guide the beads of the cover toward the deflection surfaces (13) of the corresponding engagement shoe. Each tensioning bearing (15) may advantageously be positioned between the deflection surface (13) of a corresponding engagement shoe and the drum, so as to bring and position the bead of the cover against the deflection surface (13) (cf. FIG. 4). For preference, a tensioning bearing is mounted directly on each engagement shoe (50) (cf. FIGS. 6&7).

The engagement shoe of FIGS. 6&7 comprises a tensioning bearing (15) mounted to rotate on an axis which is transverse (normal or not) to the transverse edges of the cover and is able to apply a transverse tension to the cover and to guide a bead thereof into the slot (13) of the shoe, an internal surface of which forms the deflection surface. From the moment at which a bead of the cover comes into contact with the tensioning bearing until the point at which it engages and locks into the rail, the cover is kept under transverse tension, giving that part of the cover that has already been deployed downstream of the drum a smooth appearance. The flaps remain on the outside of the tensioning bearings and therefore do not interfere with the transverse tension of the cover.

In some cases, it is not desirable to apply a transverse tension to the cover. For example, in the case of floating covers covering a swimming pool no transverse tension is applied to the cover. Likewise, in cases in which the cover has a window or opening, where material is absent, no transverse tension could be applied to this portion of the cover. In such cases, all that is required is not to use tensioning bearings (15), or else to position them at a distance less than or equal to the width of the cover. Even if no transverse tension needs to be applied to the cover, the deflection surfaces are still advantageous to the guiding of the two beads toward the inside of the rail. They simply need to be separated from one another by a distance that is less than the width of the cover, so that they do not apply any transverse tension to the cover other than its own self-weight.

In a particularly preferred alternative form of the present invention, aside from performing their function of continuously locking the bead (12b), the belts (31) also contribute to the translational movement of the drum (2) which is preferably mounted to rotate on a carriage (21) mounted on the rails (6) and transversely overhanging the surface (3) that is to be covered. In such an alternative form as depicted in FIGS. 1 and 4, said carriage comprises at each of its ends:
  (a) a drive wheel (9), the axis of rotation of which is parallel to that of said drum (2);
  (b) at least a first downstream roller (33av) and at least a second upstream roller (33am) resting on the rails (6) and allowing the longitudinal translational movement of the carriage (21) and which are mounted, the first one downstream and the second one upstream of the drive wheel (9) in the first direction (D1) of travel and therewith constitute a triangle of which the drive wheel (9) forms the top vertex (or vertex most distant from the surface that is to be covered).

Each of the two flexible belts (31) is secured only at each of its ends (35) to the four corners of the surface that is to be covered and extends along each of the longitudinal edges of the surface that is to be covered, as follows:
  (c) each belt (31) sits without slipping over the drive wheel (9) in the central section (31b) comprised between the two rollers (33av, 33am) and
  (d) each belt is arranged in the opening (14) of the rails (6) in the lateral sections (31a) comprised between a securing point (35) and the roller (33av, 33am) closest to said securing point.

In order to avoid any slippage between the belts (31) and the drive wheels (9), the surface of each belt that comes into contact with the drive wheel preferably comprises teeth which engage in corresponding teeth on the drive wheel. Alternatively, the belts may take the form of chains, or have a rough face making it possible to avoid any slippage against the drive wheel (9). Translation and locking systems of the type introduced hereinabove are described for example in WO2010010152, WO2010054960, and Belgian patent application BE2012/0725.

In the lateral section (31a) downstream of the carriage in the first direction (D1) of translation (i.e. defined between a securing point (35) and the downstream roller (33av) of the carriage), the belt (35) also acts as a bead locking system, as discussed above. The engagement shoe (50) is then situated between said corresponding downstream roller (33av) and the corresponding deflection pulley (13), as depicted in FIG. 4.

Although a G-section for the rails (6), comprising a flange on just one side of the opening (14) is enough to allow locking of the bead (12b) according to the present invention, a C-section is preferred, comprising in addition to the adjacent flange (6a) a distal second flange separated from the surface that is to be covered by the opening (14) and the adjacent flange (6a) and partially closing the opposite side of the opening (14) left by the adjacent flange (6a). Such a profile allows the translation mechanism to be secured more firmly to the rails by making provision for each engagement shoe (50) to comprise a projecting step (53) extending under the distal flange of the corresponding rail. This step prevents said engagement shoe (50) and, therefore, said longitudinal-translation mechanism to which it is attached, from coming out of the opening in the corresponding rail. The step (53) can also be slipped under the adjacent flange (6a) but the shoe will be more stable if the step is slipped under the distal flange, because the cover subjects the shoes to forces oriented towards the surface that is to be covered and which have a tendency to cause the shoes to pivot toward the cover.

In order to secure the carriage (21) to the rails more firmly still, the device preferably comprises a securing shoe (60) slipped into each rail downstream of the upstream roller (33am) and upstream of the engagement shoe (50) in the first direction (D1) of translation (cf. FIG. 4). Such a securing shoe (60) is similar to the engagement shoe (50) but does not have a slot (52) which it does not need because the securing shoe (60) does not at any time come into contact either with the cover (10) or with the bead (12b).

A device according to the present invention preferably allows the following operations illustrated in FIG. 4:
  (a) as the cover is unrolled (=cover is deployed), the bead (12b) of each longitudinal edge of the cover is guided and held in relation to the opening (14) of the corresponding rail (6) as the carriage gradually advances in the first direction (D1), thanks to the action of the deflection surfaces (13) and optionally tensioning bearings (15);
  (b) the bead is therefore introduced into the opening (14) in the rail and guided under the adjacent flange (6a) of said rail, where
  (c) the bead is blocked by the immediately subsequent insertion into the same opening of the lateral section (31a) of belt directly adjacent to the downstream roller (33av) downstream of the first direction (D1) of translational movement of the carriage, and
  (d) when the cover is being rolled back up (=cover is being removed), the central section of belt (31b) directly adjacent to the downstream roller (33av) upstream of the direction of translational movement of the carriage in the second direction (D2) is removed from said opening (14) in the rail, thus allowing the bead (12b) to disengage with the rail and making it possible for the cover to be rolled back up onto the drum (2) of the carriage.

Movement of the drum along a surface which is to be covered or uncovered generally occurs at a substantially constant speed. The drive wheels (9) therefore need to rotate at a substantially constant rotational speed. However, particularly for surfaces of great longitudinal dimensions, the outside diameters of the drum as the cover is being deployed or removed can vary considerably. Because the speed at which the cover is deployed/removed is dependent on the rotational speed of the drive wheels (which generally remains constant), and because the outside diameter of the drum varies with the amount of cover rolled up on it, it then follows that the drum and the drive wheels (9) cannot rotate at the same speed throughout the translational movement of the drum. For small sized covers it is sometimes possible to compensate for the differences in speed by pulling on the cover. For covers with greater longitudinal dimensions, such as for a swimming pool or a semitrailer, it is necessary to provide means for modifying the relative speeds of rotation of the cover rolling/unrolling drum and the axis of rotation of the drive wheels (9). These means may include a spiral-wound spring placed inside the drum (2) to make it possible to compensate for the difference between the rotational speed of the drive wheels, which has to remain substantially constant, and the rotational speed of the drum, which varies with the outside diameter of the drum as the cover is gradually rolled up/unrolled. When the cover is being deployed, the drum rotates spontaneously as a result of the tension created by the cover which is fixed to one transverse edge of the surface that is to be covered. If the spiral-wound spring becomes tensioned while the cover (10) is deployed over the surface, there is no need to motorize the rotation of the drum during the retrieval an re-rolling of the cover around the drum either, as the rotation of said drum is brought about by the relaxation of the spiral-wound ring. This system is highly advantageous because it does not require a second motor or a gearing system or any electronic control system in order to rotate the drum at the appropriate speed.

Longitudinal tension can be applied to the cover as it is being deployed simply by ensuring the speed at which the cover is unrolled by the rotation of the drum is lower than the speed of longitudinal translational movement of the drum, either by using a brake or a spring in the drum rotation system as described above, or by differentiated motorized control of the rotational and translational movements of the drum. If these two speeds are synchronous the cover will be deployed with no tension other than the tension generated by its own self-weight in the case of a cover covering the surface comprising a cavity such as a swimming pool.

The cover can be made of any material suited to the application in question: synthetic or natural textile materials, polymer films, etc. It may be transparent, opaque or translucent and may form a barrier against fluids or on the other hand may be porous, or may even comprise mesh openings such as those of a net. For example, for applications to swimming pools or water treatment basins or the like, it is possible to provide the cover with drainage holes thus allowing rainwater not to accumulate on the cover and thus avoiding the formation of pockets of water on the surface of the cover.

A covering system according to the present invention is particularly suited to covering surfaces such as:
  (a) a basin which may or may not be filled with a liquid, such as a pool, a water desalination, treatment or retaining basin;
  (b) a sports ground, such as a tennis court or cricket pitch;
  (c) a vehicle bodyshell, such as a trailer
  (d) a glazed surface such as a greenhouse, a conservatory or a vehicle window.

By virtue of the internal (15i) and/or external (15e) flaps of the present invention, the longitudinal strips (12) and their respective bead (12b) of a cover are protected from exposure to degrading, notably oxidizing, conditions such as UV radiation from the sun or vapor of corrosive compounds in the space separating the cover from the water of a swimming pool containing sterilizing chemical products. The life of the cover is thereby considerably lengthened for the benefit of users and the economy of the fitters.

The invention claimed is:

1. A device for covering a surface comprising:
  (a) a substantially rectangular cover comprising an internal face and an external face separated from one another by a thickness of the cover, and having two longitudinal edges opposite one another and two transverse edges opposite one another,
  (b) a longitudinal strip comprising an interior edge being fixed to each longitudinal edge of the cover, and comprising an exterior free edge equipped with a projecting bead extending along said edge,
  (c) rails positioned one on each side of said surface and each made of a profiled section having an opening on one face thereof and facing away from the surface to be covered, said face comprising at least one adjacent flange situated on a side adjacent to the surface that is to be covered and partially closing said opening
  (d) a drum rotatably mounted on a translation mechanism, and configured for rolling up and unrolling the cover by rotation,
    wherein the translation mechanism allowing is configured for longitudinally translating the drum in a first direction to unroll the cover from the drum and to deploy the cover over the surface to be covered with the internal face facing toward said surface and, in a second direction, to roll the cover up and to remove the cover from the surface,
  (e) wherein the surface to be covered comprises on each side a deflection surface for guiding and positioning said bead of each longitudinal strip of the cover to face the opening in the corresponding rail as the drum longitudinally translates in the first direction and the cover unrolls,
  (f) a system for continuously locking the bead of the longitudinal edges of the cover in the opening of said rails by wedging the bead under the adjacent flange of the corresponding rail as the cover is gradually unrolled as the drum longitudinally translates in the first direction, and, as the drum longitudinally translates in the second direction, to release the bead, disengaging the bead as the cover is gradually rolled up,
wherein the cover comprises at least one flap extending along each of the longitudinal edges and configured for, when a portion of each bead is wedged under the adjacent flange of the corresponding rail, isolating the portion of the longitudinal strip that corresponds to the trapped bead portion either from the atmosphere prevailing between the internal face of the deployed cover portion and the surface portion covered, or from solar radiation.

2. The device as claimed in claim 1, comprising an internal flap extending from the internal face of the cover as far as a free end covering part of the longitudinal strip, without covering the bead, configured for compressing the internal flap between the adjacent flange and the longitudinal strip, when the bead is wedged under the adjacent flange (6a) of the corresponding rail, thus forming a relatively fluid tight seal.

3. The device as claimed in claim 1, comprising an external flap extending from the external face of the cover as far as a free end covering the longitudinal strip, including the bead, configured for covering the longitudinal strip when the bead is wedged under the adjacent flange of the corresponding rail.

4. The device as claimed in claim 1, in which at least one flap is an integral part of the cover, wherein the longitudinal edge of the cover forms a free end of the at least one flap.

5. The device as claimed in claim 1, in which at least one flap is formed by a tape comprising an internal edge fixed to the cover parallel to each longitudinal edge of the cover, and a free external edge forming the free end of the at least one flap.

6. The device as claimed in claim 5, in which the tape is fixed to the cover by welding, bonding, stitching, stapling or riveting.

7. The device as claimed in claim 1, in which the longitudinal strip including the bead comprises a fabric made of ultrahigh molecular weight polyethylene (UHMPE) fibers or of high density polyethylene (PEHD) fibers, or of aramid fibers or of aromatic polyester fibers.

8. The device as claimed in claim 7, in which the longitudinal strip is fixed to the cover by stitching, bonding, welding, stapling or riveting.

9. The device as claimed in claim 1, in which the locking system additionally comprises two flexible belts, each one being configured
- for locking the bead in the opening of the corresponding rail by wedging the bead engaged under the adjacent flange of the corresponding rail, when the flexible belt is inserted in the opening of said rail; and
- for releasing the bead from under the flange, when the flexible belt is removed from the opening.

10. The device as claimed in claim 9, in which the movement mechanism comprises a carriage mounted on the rails and transversely overhanging the surface to be covered and supporting the drum, and comprising at each of its ends:
  (a) a drive wheel comprising an axis of rotation parallel to an axis of rotation of the drum;
  (b) at least a first downstream roller and at least a second upstream roller resting on the rails and are mounted, the first one downstream and second one upstream of the drive wheel in the first direction of longitudinal translation and therewith constitute a triangle of which the drive wheel forms a top apex;

and in which each of the two flexible belts is fixed only at two fixing points located at each of its ends to the four corners of the surface that is to be covered and extends along the longitudinal edges of the surface to be covered, as follows:
  (c) it sits over the downstream roller which lays it down in the opening in the corresponding rail as the carriage moves in the first direction, and it sits over the upstream roller which lays it down in the opening of the corresponding rail when the carriage moves in the second direction,
  (d) it is laid down in the opening in the rails in the lateral sections comprised between a fixing point and the roller closest to said fixing point, and
  (e) it sits without slipping on the drive wheel in the central section comprised between the two rollers.

11. The device as claimed in claim 1, in which the deflection surface is at least partially formed of an interior surface of a slot arranged in an engagement shoe:
  said slot having a face opening extending over a surface parallel to the corresponding rail and facing toward the surface that is to be covered,
  said opening having a width less than the dimension of the bead, and
  said slot comprises a curved cross section allowing the bead of the cover to be brought tangentially into the opening and under the adjacent flange of the corresponding rail.

12. The device as claimed in claim 11, in which the insertion shoe comprises a substantially cylindrical deflection pulley rotatably mounted to rotate about an axis parallel to the transverse direction of the cover, said deflection pulley having a distal end distant from the surface to be covered, and a proximal end adjacent to said surface, and in which the curved cross section of the slot is formed at least in part by the distal end of the deflection pulley pressing the corresponding bead of the cover partially wrapped around said deflection pulley for changing the orientation of the cover.

13. The device as claimed in claim 12, in which the distal end of each deflection pulley situated on each side of the surface that is to be covered presses against the corresponding bead, thus applying tension to the cover in the transverse direction as it is being unrolled, said tension being maintained as the cover is being locked in the rails.

14. The device as claimed in claim 9, additionally comprising a tensioning bearing rotatably mounted on each engagement shoe, to rotate about an axis of rotation transverse to the transverse edges of the covering and which guides the bead of the cover into the slot in the corresponding engagement shoe.

15. The device as claimed in claim 1 wherein the surface to be covered is selected from:
  (a) a basin filled or not with a liquid, including a pool, a water desalination, treatment or retaining basin;
  (b) a sports ground, including a tennis court or cricket pitch;
  (c) a vehicle bodyshell, or
  (d) a glazed surface including a greenhouse, a conservatory or a vehicle window.

* * * * *